United States Patent [19]

Krivec

[11] Patent Number: 5,346,022
[45] Date of Patent: Sep. 13, 1994

[54] TORQUE LIMITING DEVICE FOR AIR IMPACT TOOL

[75] Inventor: Bert Krivec, Waukesha, Wis.

[73] Assignee: Snap-on Incorporated, Kenosha, Wis.

[21] Appl. No.: 11,497

[22] Filed: Jan. 29, 1993

[51] Int. Cl.⁵ ..................... B25B 23/157; F16D 3/56
[52] U.S. Cl. ..................................... 173/178; 81/467; 81/473; 192/56 R
[58] Field of Search .................. 173/176, 178; 81/467, 81/469, 470, 473, 474, 476, 477; 192/56 R, 150, 0.034

[56] References Cited

U.S. PATENT DOCUMENTS

| | | |
|---|---|---|
| 2,533,730 | 12/1950 | Wilhide et al. . |
| 2,558,158 | 6/1951 | Rock . |
| 2,771,804 | 11/1956 | Better et al. .................. 81/474 |
| 2,773,370 | 12/1956 | Intraub et al. . |
| 3,019,595 | 2/1962 | Murrle . |
| 3,103,999 | 9/1963 | Rabinow et al. . |
| 3,166,168 | 1/1965 | Hornschuch . |
| 3,210,959 | 10/1965 | Brown . |
| 3,335,580 | 8/1967 | Simpson, Jr. . |
| 3,347,062 | 10/1967 | Schumann et al. . |
| 3,450,214 | 6/1969 | Bangerter et al. .................. 173/178 |
| 3,612,236 | 10/1971 | Fernstrom . |
| 3,616,883 | 11/1971 | Sindelar . |
| 3,752,277 | 8/1973 | Nakai . |
| 3,877,253 | 4/1975 | Yeagle . |
| 3,937,036 | 2/1976 | Sauerwein . |
| 3,942,338 | 3/1976 | Furlette et al. . |
| 4,019,589 | 4/1977 | Wallace .................. 173/178 |
| 4,066,136 | 1/1978 | Wanner et al. . |
| 4,287,974 | 9/1981 | Krejci . |
| 4,313,505 | 2/1982 | Silvern . |
| 4,317,253 | 3/1982 | Gut . |
| 4,327,563 | 5/1982 | Allmacher, Jr. . |
| 4,347,902 | 9/1982 | Wallace et al. . |
| 4,566,570 | 1/1986 | Geisthoff . |
| 4,610,339 | 9/1986 | Ciolli . |
| 4,687,082 | 8/1987 | Lenfeldt . |
| 4,702,122 | 10/1987 | Richard . |
| 4,774,864 | 10/1988 | Dossier .................. 81/476 |
| 4,811,797 | 3/1989 | Antipov et al. . |
| 4,823,885 | 4/1989 | Okumura .................. 173/178 |
| 4,861,201 | 8/1989 | Cuilleron . |
| 4,883,130 | 11/1989 | Dixon . |
| 4,901,836 | 2/1990 | Stenmark et al. . |

FOREIGN PATENT DOCUMENTS

| | | | |
|---|---|---|---|
| 0221382 | 9/1991 | Japan .................. | 81/476 |

*Primary Examiner*—Scott Smith
*Attorney, Agent, or Firm*—Emrich & Dithmar

[57] ABSTRACT

An air impact tool has an air motor driving a rotary impact mechanism which has a drive shaft which is coupled to a coaxial load shaft through a torque-limiting clutch mechanism which includes a rigid torque member coupled to one of the shafts and having a peripheral drive surface with drive surface portions, and a yieldable torque member coupled to the other shaft. A plurality of flexible and resilient arms on the yieldable torque member are equiangularly spaced apart around the axis of rotation parallel thereto and are cantilevered from a support yoke, the distal ends of the arms being respectively engaged with the drive surface portions of the torque receiving member. A retaining cylinder encircles the arms and holds them against the drive surface, the retaining cylinder being threadedly engaged with an adjusting member which is rotatable but axially fixed to effect axial movement of the retaining cylinder to vary the retaining force on the torque transmitting arms. Embodiments showing internally and externally threaded retaining cylinders, and planar and concave drive surface portions are disclosed.

20 Claims, 3 Drawing Sheets

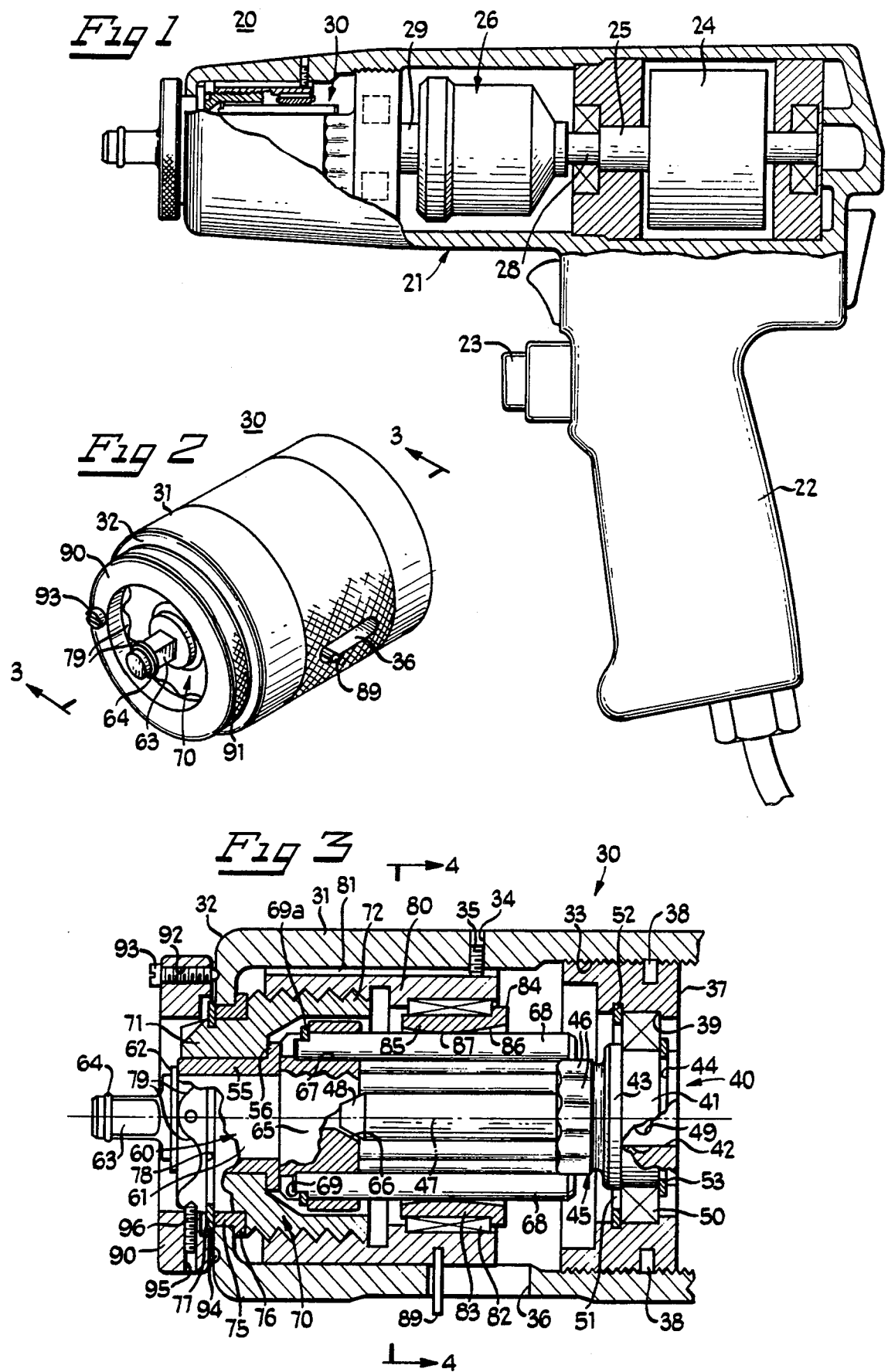

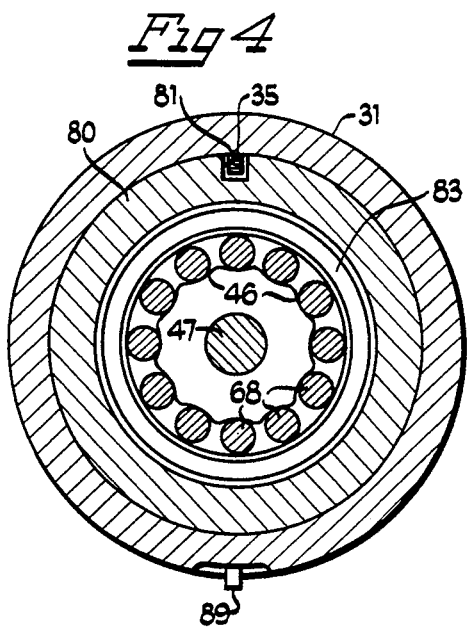
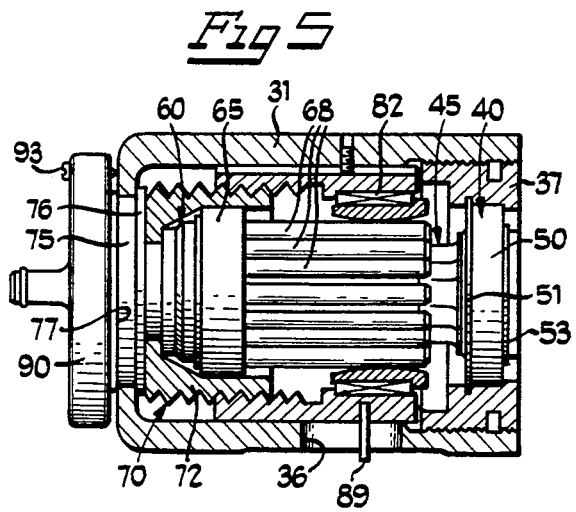
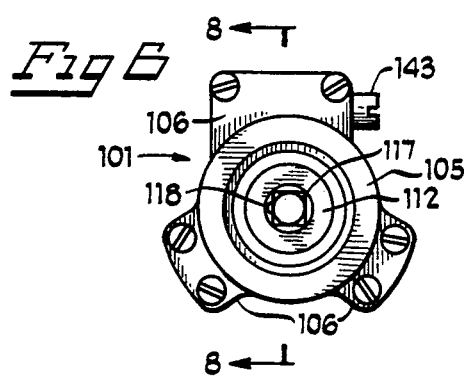
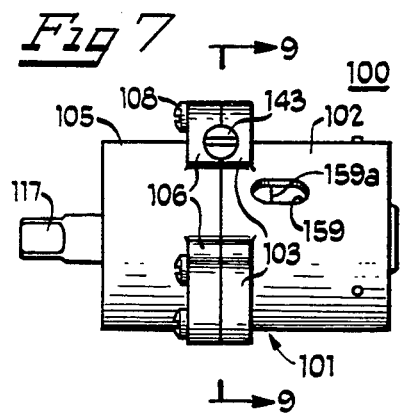
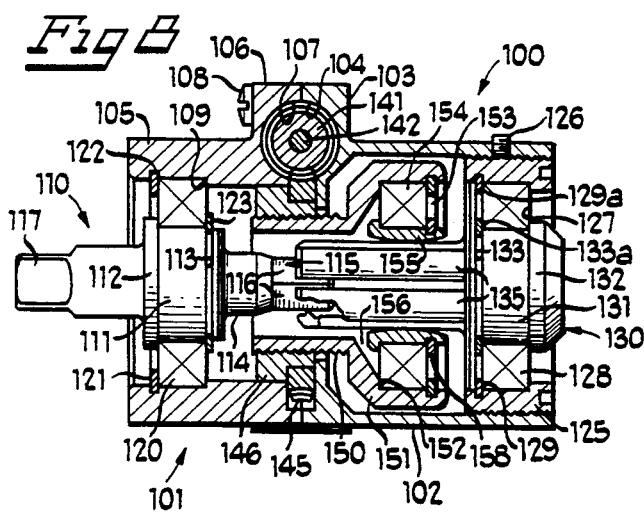
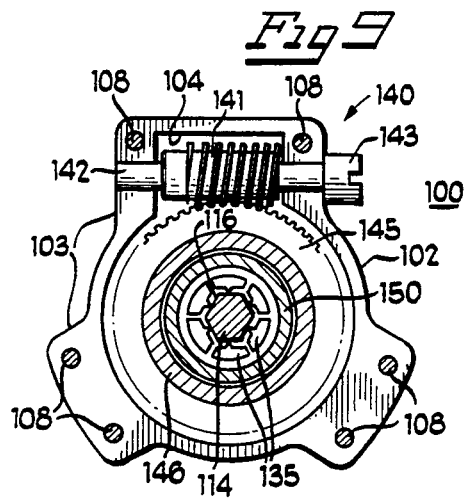

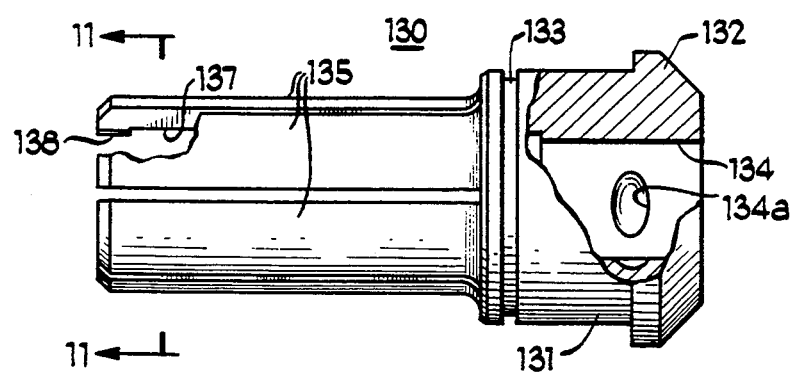
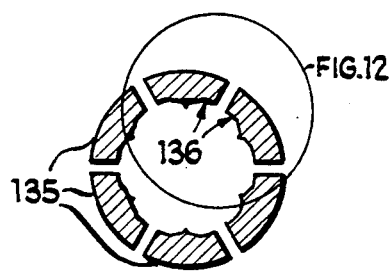
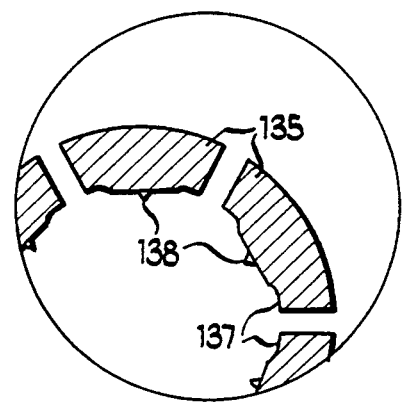

TORQUE LIMITING DEVICE FOR AIR IMPACT TOOL

BACKGROUND OF THE INVENTION

1. Field of the Invention

The present invention relates to power tools such as impact wrenches and, particularly, to mechanisms for limiting the torque which such tools can deliver.

2. Description of the Prior Art

It is known to provide torque-limiting clutch mechanisms in various types of rotary devices, including rotary power tools, such as air impact wrenches. Many such prior art slip or torque-limiting clutch mechanisms are constituted by rigid metal bodies, such as steel balls, which are disposed in radially directed grooves and are displaceable between an engaged condition and a release condition. They are retained in their engaged conditions by an elastic force generated by pressure springs which act directly, or via hydraulic plungers. Consequently, such clutches are relatively complicated from the structural point of view and are not suitable for use in impact tools. Furthermore, many such slip clutch arrangements are not readily adjustable for varying the torque at which the clutch will slip.

It is also known to provide a radial torque limiting mechanism which includes resilient rods or arms having fingers engageable in corresponding radial slots or recesses in a driven member with a force with is variable. When the load torque exceeds this force the arms slip out of the recesses and rotate relative to the driven member. Such arrangements have not heretofore been used in power tools.

Other types of torque-limiting coupling devices have utilized flat cam surfaces disposed in camming engagement with polygonal cam follower surfaces, but such arrangements have not been adjustable for varying the torque at which the mechanism will slip.

SUMMARY OF THE INVENTION

It is a general object of the present invention to provide an improved torque-limiting mechanism which avoids the disadvantages of prior mechanisms while affording additional structural and operating advantages.

An important feature of the invention is the provision of a torque-limiting mechanism of the type set forth which is of relatively simple and economical construction.

Still another feature of the invention is the provision of a torque-limiting mechanism of the type set forth, which is readily adjustable for varying the torque at which the mechanism will slip.

In connection with the foregoing features, another feature of the invention is the provision of a power tool incorporating a torque-limiting clutch mechanism of the type set forth.

These and other features of the invention are attained by providing a torque limiting mechanism comprising: two coaxial shafts having an axis of rotation, a rigid torque member coupled to one of the shafts and having a peripheral surface including a plurality of drive surface portions, a plurality of flexible and resilient torque members coupled to the other of the shafts for engagement with the peripheral drive surface, threaded cylindrical retaining means encircling the resilient torque members and disposed in engagement therewith for holding them in engagement with the peripheral drive surface with a predetermined force for preventing rotation of the resilient torque members and the rigid torque member relative to each other about the axis at torques below a predetermined torque, the resilient torque members being yieldable at the predetermined torque and above to accommodate relative rotation of the resilient torque members and the rigid torque member, an adjusting member encircling the yieldable torque members and disposed in threaded engagement with the cylindrical retaining means, and means coupled to the adjusting member for accommodating rotation thereof about the axis while preventing axial movement thereof, thereby to effect axial movement of the cylindrical retaining means relative to the resilient torque members for varying the predetermined force to vary the torque at which the resilient torque members will yield.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a side elevational view, in partial vertical section of an air impact tool incorporating a clutch assembly constructed in accordance with and embodying the features of a first embodiment of the present invention;

FIG. 2 is an enlarged, perspective view of the clutch assembly of FIG. 1, with an independent housing;

FIG. 3 is a further enlarged view in vertical section taken along the line 3—3 in FIG. 2, with portions broken away to more clearly illustrate the construction;

FIG. 4 is a view in vertical section taken along the line 4—4 in FIG. 3;

FIG. 5 is a reduced view in partial vertical section, similar to FIG. 3, but with the biasing ring positioned differently;

FIG. 6 is an end elevational view of a clutch assembly in accordance with a second embodiment of the invention;

FIG. 7 is a side elevational view of the clutch assembly of FIG. 6;

FIG. 8 is an enlarged view in vertical section taken along the line 8—8 in FIG. 6;

FIG. 9 is an enlarged view in vertical section taken along the line 9—9 in FIG. 7;

FIG. 10 is a further enlarged side elevational view in partial section of the flexible torque member of the clutch assembly of FIGS. 6-9 with portions broken away to more clearly illustrate the construction;

FIG. 11 is a view in vertical section taken along the line 11—11 in FIG. 10; and FIG. 12 is a further enlarged fragmentary sectional view of a portion of FIG. 11.

DESCRIPTION OF THE PREFERRED EMBODIMENTS

Referring to FIG. 1, there is illustrated an air impact tool, generally designated by the numeral 20, which incorporates a torque-limiting clutch assembly 30 in accordance with the present invention. The tool 20 has a housing 21 including a handle portion 22 provided with a trigger 23 for actuating an air motor 24 of standard construction disposed within the housing 21. The air motor 24 has an output shaft 25 and is adapted for coupling to an impact assembly 26, such as a known rotary hammer and anvil, which includes an input shaft 28 and an output shaft 29. The air motor output shaft 25 is coupled to the input shaft 28 of the impact assembly 26, the output shaft 29 of which is coupled to the clutch assembly 30, which is constructed in accordance with and embodies the features of a first embodiment of the present invention.

Referring now to FIGS. 2–5, the clutch assembly 30 includes a cylindrical housing 31 having a radially inwardly extending lip or flange 32 at one end thereof and being internally threaded, as at 33, at the other end thereof. A radial, internally threaded bore 34 is formed through the housing 31 for accommodating a set screw 35. An elongated slot 36 is formed through the housing 31 and extends longitudinally thereof at a location substantially diametrically opposite the bore 34. An annular nut 37 is threadedly received in the threaded end 33 of the housing 31 and is provided with radially extending nylon locking pins 38. The inner cylindrical surface of the nut 37 has an annular, radially-extending shoulder 39 formed therein. While the clutch assembly 30 is illustrated in FIGS. 2–5 as having a separate housing 31, it will be appreciated that the housing 31 may be formed as the forward portion of the air impact tool housing 21, as is illustrated in FIG. 1.

The clutch assembly 30 includes a rigid torque member 40, which has a cylindrical body 41 provided at one end thereof with an axially extending square drive socket 42, adapted to be coupled to the output shaft 29 of the impact assembly 26 in a known manner. Extending radially outwardly from the body 41 is an annular flange 43, and a circumferential groove 44 is formed in the outer surface of the body 41 a predetermined axial distance from the flange 43. The member 40 is also provided with a peripheral drive surface 45 which may be generally sinusoidal-shaped or wavy in transverse cross section, so as to define a plurality of concave drive surface portions 46 equiangularly spaced apart about the axis of the member 40. In the illustrated embodiment the drive surface portions 46 are 12 in number, but it will be appreciated that any desired number could be provided. Also, the drive surface 45 could be polygonal in shape, such as hexagonal, having flat surface portions, if desired. The member 40 also includes an elongated cylindrical shaft 47 which projects axially from the drive surface 45 coaxially therewith and terminates in a frustoconical nose 48. The square drive socket 42 may be provided with a plurality of shallow arcuate detent recesses 49 for cooperating with a spring-biased ball of an associated square drive shaft to resiliently latch the parts together in a known manner. Alternatively, the socket 42 could be designed as a spline drive socket.

The rigid torque member 40 is rotatably mounted in a ball or sleeve bearing 50 which supports the member 40 coaxially with the nut 37. The bearing 50 is seated against the shoulder 39 of the nut 37 and against the flange 43 of the torque receiving member 40, being retained in place by an inner retaining ring 51 seated in a complementary groove 52 in the nut 37 and by an outer retaining ring 53 seated in the groove 44 of the rigid torque member 40.

At the opposite end of the housing 31, there is a cylindrical flange bearing 55 provided at the axially inner end thereof with a radially outwardly extending flange 56. Rotatably journalled in the bearing 55 is a yieldable torque member or spindle 60 which has an elongated shank 61 disposed coaxially within the bearing 55 and positioned axially with respect thereto by a retaining ring 62 which is seated in a complementary groove in the outer surface of the spindle 60. Projecting axially outwardly of the shank 61 is a square output drive end 63 provided with O-ring 64 and adapted for coupling in a known manner to an associated tool, such as a socket or the like. The spindle 60 is provided at the inner end of the shank 61 with an enlarged-diameter support end 65, which seats against the flange 56 of the bearing 55. The support end 65 has a short, frustoconical axial bore 66 formed in the inner end thereof for receiving the nose 48 of the shaft 47 of the rigid torque member 40. The support end 65 is also provided adjacent to its outer periphery with a plurality of equiangularly spaced-apart and internally threaded through bores 67 extending parallel to the axis of the spindle 60 and arranged in a circle therearound concentric therewith, the bores 67 being 12 in number in the illustrated embodiment.

Respectively threadedly engaged in the bores 67 are 12 elongated clutch rods or arms 68 which have a limited resilient flexibility. Each of the rods 68 has a notched end 69 which projects beyond the end of the associated bore 67. The notched ends 69 cooperate to receive an associated retaining ring 69a to prevent rotation of the rods 68, thereby to prevent their accidental disengagement, once they have been threadedly secured to the support end 65 of the spindle 60. Each of the rods 68 has a length such that, when the parts are assembled as illustrated in FIG. 3, the distal end thereof overlaps and engages the drive surface 45 of the rigid torque member 40. More specifically, in the normal rest condition, the distal ends of the rods 68 are respectively seated in the concave drive surface portions 46 of the drive surface 45. While threaded coupling of the rods 68 to the spindle 60 is disclosed, press fitting of the rods 68 in the bores 67 could also be used.

The clutch assembly 30 also includes a torque adjusting or selecting screw 70, which is generally cylindrical in shape and includes a small-diameter end 71 which coaxially encircles and engages the outer surface of the bearing 55. Projecting from the small diameter end 71 axially inwardly of the housing 31 is an externally threaded large-diameter end portion 72, which defines a cylindrical cavity in which the support end 65 of the torque transmitting spindle 60 is disposed. Disposed coaxially between the small diameter end 71 of the adjusting screw 70 and the radially inner edge of the housing flange 32 is a flange bearing 75, provided at its axially inner end with a radially outwardly extending flange 76 which is disposed between the housing flange 32 and the large-diameter end portion 72 of the torque adjusting screw 70 for axially positioning the parts, the bearing 75 being retained in place by a retaining ring 77 seated in a complementary circumferential groove 78 in the outer surface of the small diameter portion 71 of the adjusting screw 70.

The axially outer end face of the small-diameter portion 71 may be provided with a plurality of flutes 79 to facilitate manual grasping and rotation thereof. In this regard, it will be appreciated that the torque adjusting screw 70 is freely rotatable between the bearings 55 and 75, axial movement being prevented by engagement of the retaining ring 77 and the bearing ring flange 76 with the housing flange 32. Similarly, it will be appreciated that the yieldable torque spindle 60 is rotatable within the bearing 55.

The threaded large-diameter portion 72 of the adjusting screw 70 is telescopically received within and threadedly engaged with a selector or adjusting nut 80, which is a cylindrical member having an elongated axial groove 81 formed in the outer surface thereof for receiving the set screw 35 to prevent rotation of the adjusting nut 80. Thus, it will be appreciated that the adjusting nut 80 will move axially in response to rotation of the adjusting screw 70, the axial movement being guided by the groove 81 and the set screw 35. The adjusting nut 80 projects axially inwardly of the housing 31 beyond the inner end of the adjusting screw 70 and has its inner surface rotatably engaged with a shell bearing 82, which is seated in a generally cylindrical reaction ring 83. More specifically, the bearing 82 is fixed between a radially outwardly extending annular flange 84 at one end of the reaction ring 83 and an annular shoulder on the adjusting nut 80. The inner surface of the reaction ring 83 defines frustoconical surfaces 85 and 86 which intersect at a contact circle 87 disposed for encircling engagement with the clutch rods 68.

It will be appreciated that, as the adjusting nut 80 is moved axially in response to rotation of the adjusting screw 70, the reaction ring 83 will move axially along the clutch rods 68. Fixedly secured to the adjusting nut 80 and projecting radially outwardly therefrom through the housing slot 36 is an indicator pin 89 which indicates, by its position in the slot 36, the relative position of the reaction ring 83 along the clutch rods 68.

In order to facilitate manual rotation of the adjusting screw 70, there is provided an adjustment knob 90 which is in the nature of an annular member having a knurled cylindrical outer surface 91 to facilitate gripping. An internally threaded bore 92 is formed through the knob 90 parallel to the axis of rotation thereof for threadedly receiving a ball plunger 93, which has a ball end engageable in complementary detent recesses 94 on the outer surface of the housing flange 32. Also formed through the knob 90 are a plurality of equiangularly spaced-apart, internally threaded, radial bores 95 (one shown) receiving set screws 96 to fix the knob 90 to the adjusting screw 70.

In operation, the output shaft 29 of the impact assembly 26 has a spline or square drive end which is received in the spline or square drive socket 42 of the rigid torque member 40 for coupling the two together in a known manner. When the air motor 24 is operated, it operates the impact assembly 26, the output shaft 29 of which, in turn, rotates the rigid torque member 40 of the clutch assembly 30. Because the clutch rods 68 are respectively seated in the concave drive surface portions 46, there is a frictional coupling therebetween and the rotation of the rigid torque member 40 will effect a corresponding rotation of the yieldable torque member 60 and, thereby, its square drive end 63. Because of the cantilever mounting of the clutch rods 68, they resiliently or yieldably engage the rigid torque member 40, such that when a predetermined torque is reached the clutch rods 68 will deflect sufficiently to cam out of the corresponding concave drive surface portions 46 and slip around the periphery of the drive surface 45. Thus, the torque which can be applied to a load by the tool 20 is limited by the torque at which the clutch assembly 30 will slip.

It is a significant aspect of the invention that the force with which the clutch rods 68 engage the drive surface 45 and, accordingly, the torque at which the clutch assembly 30 will slip, is a function of the axial position of the reaction ring 83 along the clutch rods 68. Thus, it will be appreciated that the closer the reaction ring 83 is to the distal ends of the clutch rods 68, the more firmly they will engage the drive surface 45 and the greater will be the limit torque at which the clutch assembly 30 will slip. Thus, it will be appreciated that the limit torque is selectable by the operator by manual rotation of the adjusting screw 70, either directly or by use of the adjustment knob 90. For this purpose, suitable access to the knob 90 is provided in the tool housing 21. As the adjusting nut 80 and the reaction ring 83 are moved axially in response to this rotation of the adjusting screw 70, the indicator pin 89 moves axially to indicate the axial position. If desired, suitable indicia may be provided along the outer surface of the housing 31 to indicate the limit torques corresponding to several axial positions.

It is an important aspect of the invention that, in the event that one of the clutch rods 68 becomes damaged or broken it can be individually replaced, thereby obviating replacement of the entire spindle 60.

Referring now to FIGS. 6–9, there is illustrated an alternative clutch assembly 100 in accordance with the present invention. The clutch assembly 100 has a two-part housing 101, including a cylindrical input member 102 which is internally threaded at one end thereof and is provided at the opposite end thereof with three equiangularly spaced apart and radially outwardly extending attachment flanges 103. A part-cylindrical recess 104, extending perpendicular to the axis of the housing member 102, is formed in the outer surface of one of the flanges 103. The housing 101 also includes a cylindrical output member 105 which is provided at one end with three radially outwardly extending attachment flanges 106 disposed for mating engagement with the flanges 103, the one of the flanges 106 adapted for mating with the recessed flange 103 being provided with a part-cylindrical recess 107 in its outer surface. Thus, it will be appreciated that when the housing members 102 and 105 are joined together, the recesses 104 and 107 cooperate to define a substantially cylindrical cavity. The flanges 103 and 106 are joined together by a plurality of screws 108. A radially extending annular shoulder 109 is formed on the inner surface of the output housing member 105 intermediate the ends thereof.

The clutch assembly 100 includes a rigid torque member 110 having a cylindrical body 111 provided with a radially outwardly extending circumferential flange 112 and, spaced axially from the flange 112, a circumferential groove 113. Projecting from the body 111 axially inwardly of the housing 101 is a reduced-diameter shaft 114 provided at its distal end with a peripheral drive surface 115 which is polygonal in transverse cross section, so that the drive surface 115 comprises a plurality of planar facets 116. In the illustrated embodiment, the drive surface 115 is hexagonal so that there are six facets 116, but it will be appreciated that any number of facets could be utilized. Projecting from the other end of the body 111 axially outwardly of the housing 111 is a square drive output shaft 117, which may be provided with a spring-loaded detent ball 118 (FIG. 6) in a known manner. Alternatively, a spline drive output shaft could be provided.

The rigid torque member 110 is rotatably supported in a ball bearing 120 coaxially with the housing 101. More specifically, the ball bearing 120 is seated against the housing shoulder 109 and the flange 112 of the rigid torque member 110, being retained in place by an outer retaining ring 121 received in a complementary groove 122 in the output housing member 105 and a retaining ring 123 seated in the groove 113 in the rigid torque member 110.

Threadedly engaged in the other end of the housing 101 is an annular yoke holder 125, which may be abutted by a nylon tip set screw 126 threadedly engaged in a bore in the housing 101. The inner surface of the yoke holder 125 is provided with a radially inwardly extending annular shoulder 127 against which is seated a ball bearing 128 retained in place by a retaining ring 129 seated in a complementary groove 129a in the inner surface of the yoke holder 125.

Referring also to FIGS. 10–12, rotatably journalled in the bearing 128 is a yieldable torque member or spindle 130, which has a cylindrical body 131 coaxially disposed in the bearing 128 and is provided with a radially outwardly extending circumferential flange 132 which bears against the outer surface of the bearing 128. Formed in the outer surface of the body 131 is a circumferential groove 133, in which is seated a retaining ring 133a for cooperation with the flange 132 to position the spindle 130 with respect to the bearing 128. Formed axially in the outer end of the body 131 is a square or spline drive socket 134, which may be provided with a plurality of detent recesses 134a (FIG. 10) for cooperation with an associated square or spline drive in a known manner.

Unitary with the body 131 and projecting therefrom axially inwardly of the housing 101 are six elongated, equiangularly spaced-apart arms 135 which have a limited resilient flexibility. The lengths of the arms 135 are such that they overlap the drive surface 115 of the rigid torque member 110, being normally respectively disposed for engagement with the planar facets 116 thereof. Referring in particular to FIGS. 11 and 12, each of the arms 135 has an inner surface 136 which is provided with a longitudinally extending undercut 137 adjacent to the distal end thereof for defining a rib 138 at the distal end. The ribs 138 provide substantially point or line contact with the polygonal drive surface 115.

The clutch assembly 100 has a torque adjusting mechanism 140, which includes a worm 141 disposed within the cavity defined by the part-cylindrical recesses 104 and 107 of the housing flanges. The worm 141 is provided with a shaft 142 which is rotatably received in reduced-diameter portions of the cylindrical cavity. The shaft 142 is provided at one end thereof with a drive head 143 for effecting rotation thereof by the use of a suitable tool, such as a screwdriver or the like. The worm 141 is disposed in meshing engagement with a worm gear 145 which is disposed between the housing members 102 and 105 which is, in turn, fixedly secured by any suitable means to an annular, internally-threaded adjusting nut 146. It will be appreciated that rotation of the worm 141 will effect a corresponding rotation of the worm gear 145 and the adjusting nut 146 about the axis of the housing 101 in a known manner.

The clutch assembly 100 also includes an externally threaded, cylindrical selecting or adjusting screw 150 disposed in encircling relationship with the arms 135 of the spindle 130, and in meshing engagement with the adjusting nut 146. The adjusting screw 150 has an enlarged-diameter cylindrical end 151 disposed toward the yoke holder 125 and defining an annular shoulder 152 against which is seated a ball bearing 154, retained in place by a retaining ring 153 seated in a complementary circumferential groove in the inner surface of the enlarged-diameter end 151. Disposed between the bearing 154 and the arms 135 of the spindle 130 is an annular reaction ring 155, which is provided at one end with a radially outwardly extending flange 156 seated against the bearing 154, which is retained at the other end thereof by a retaining ring 158 seated in a complementary groove in the reaction ring 155. Preferably, the reaction ring 155 is similar to the reaction ring 83 described above in connection with FIGS. 2–5, having frustoconical surfaces which intersect at a contact circle for providing essentially line contact with the arms 135 of the spindle 130. The input housing member 102 is provided with an axially elongated window or aperture 159 through which may be observed an indicium 159a on the enlarged diameter end 151 of the adjusting screw 150.

The clutch assembly 100 operates similarly to the clutch assembly 30 described above. However, it will be appreciated that because of the outwardly projecting flanges 103 and 106 on the housing 101, the clutch assembly 100 will be mounted in a different manner in an associated tool, such as an air impact tool or the like. Also, in this case it will be noted that the yieldable spindle 130 forms the input end of the clutch assembly 100 while the rigid torque member 110 forms the output end, which is the opposite of the configuration of the clutch assembly 30. Thus, the square drive socket 134 will receive the output shaft 29 of the impact assembly 26 for coupling the spindle 130 thereto, while the output shaft 117 will be coupled through an associated end effector tool to a load.

The distal ends of the arms 135 of the spindle 130 frictionally engage the planar facets 116 on the rigid torque member 110, so that rotation of the spindle 130 will effect a corresponding rotation of the member 110. At a predetermined torque applied to the associated load, the arms 135 will slip around the polygonal drive surface 115, thereby to limit the torque application. It will be appreciated that the limit torque value can be manually adjusted by the operator by rotation of the worm 141, thereby effecting a corresponding movement of the adjusting screw 150 and the associated reaction ring 155 axially of the arms 135 for varying the force with which they are held in engagement with the polygonal drive surface 115.

From the foregoing, it can be seen that there has been provided an improved torque-limiting clutch assembly for an air impact tool, which is easily manually adjustable by a user for selection of the limit torque value.

I claim:

1. A torque limiting mechanism comprising:
two coaxial shafts having an axis of rotation, a rigid torque member coupled to one of said shafts and having a peripheral drive surface including a plurality of drive surface portions, a plurality of flexible and resilient torque members coupled to the other of said shafts for engagement with said peripheral drive surface, threaded cylindrical retaining means encircling said resilient torque members and disposed in engagement therewith for holding said resilient torque members in engagement with said peripheral drive surface with a predetermined force for preventing rotation of said resilient torque members and said rigid torque member relative to each other about said axis at torques below a predetermined torque, said retaining means having a sloping engagement portion shaped and dimensioned substantially to make point contact with each of said resilient torque members longitudinally thereof, said resilient torque members being yieldable at said predetermined torque and above to accommodate relative rotation between said resilient torque members and said rigid torque member, an adjusting member encircling said resilient torque members and disposed in threaded engagement with said cylindrical retaining means, and means coupled to said adjusting member for accommodating rotation thereof about said axis while preventing axial movement thereof, thereby to effect axial movement of said cylindrical retaining means relative to said resilient torque members for varying said predetermined force to vary the torque at which said resilient torque members will yield.

2. The mechanism of claim 1, wherein said retaining means is internally threaded.

3. The mechanism of claim 2, wherein said adjusting member is manually rotatable about said axis.

4. The mechanism of claim 3, and further comprising manually operable means removably mounted on said adjusting member for facilitating manual rotation thereof.

5. The mechanism of claim 1, and further comprising anti-rotation means coupled to said retaining means for preventing rotation thereof.

6. The mechanism of claim 5, wherein said anti-rotation means includes a housing encompassing said retaining means and having an opening therein, and a set screw extending through said opening and engageable with said retaining means.

7. The mechanism of claim 6, wherein said retaining means has an elongated axial groove therein, said set screw being fixed to said housing and disposable in said groove for guiding axial movement of said retaining means while preventing rotation thereof.

8. The mechanism of claim 1, wherein said retaining means is externally threaded.

9. The mechanism of claim 8, and further comprising gear mechanism coupled to said adjusting member for effecting rotation thereof.

10. The mechanism of claim 1, wherein said peripheral drive surface has a transverse cross section which defines a regular polygon.

11. The mechanism of claim 1, wherein said drive surface portions are concave.

12. The mechanism of claim 1, and further comprising support means coaxial with said shafts and unitary with said resilient torque members for supporting said resilient torque members in cantilever fashion.

13. The mechanism of claim 12, wherein each of said resilient torque members is generally trapezoidal in transverse cross section.

14. The mechanism of claim 12, wherein said resilient torque members are removably mounted on said support means.

15. A power tool for applying torque to a load comprising:

motive means for generating torque, two coaxial shafts respectively adapted for coupling to the load and said motive means and having an axis of rotation, and torque-limiting clutch mechanism interconnecting said shafts, said clutch mechanism including a rigid torque member coupled to one of said shafts and having a peripheral drive surface including a plurality of drive surface portions, a plurality of flexible and resilient torque members coupled to the other of said shafts and disposed for engagement with said peripheral surface, threaded cylindrical retaining means encircling said resilient torque members and disposed in engagement therewith for holding said resilient torque members in engagement with said peripheral drive surface with a predetermined force for preventing rotation of said resilient torque members and said rigid torque member relative to each other about said axis at torques below a predetermined torque, said retaining means having a sloping engagement portion shaped and dimensioned substantially to make point contact with each of said resilient torque members longitudinally thereof, said resilient torque members being yieldable at said predetermined torque and above to accommodate relative rotation between said resilient torque members and said rigid torque member, an adjusting member encircling said resilient torque members and disposed in threaded engagement with said cylindrical retaining means, and means coupled to said adjusting member for accommodating rotation thereof about said axis while preventing axial movement thereof, thereby to effect axial movement of said cylindrical retaining means relative to said resilient torque members for varying said predetermined force to vary the torque at which said resilient torque members will yield.

16. The power tool of claim 15, wherein said tool is an impact tool.

17. The power tool of claim 15, wherein said retaining means is internally threaded.

18. The power tool of claim 15, wherein said retaining means is externally threaded.

19. The power tool of claim 15, and further comprising anti-rotation means coupled to said retaining means for preventing rotation thereof.

20. The power tool of claim 15, wherein said peripheral drive surface has a transverse cross section which defines a regular polygon.

* * * * *